United States Patent [19]

Adachi et al.

[11] 4,305,568
[45] Dec. 15, 1981

[54] VIBRATION DAMPING MECHANISM FOR HYDRAULIC BOOSTER

[75] Inventors: Yoshiharu Adachi, Gamagohri; Hiromu Kuromitsu, Chiryu, both of Japan

[73] Assignee: Aisin Seiki Kabushiki Kaisha, Kariya, Japan

[21] Appl. No.: 96,340

[22] Filed: Nov. 21, 1979

[30] Foreign Application Priority Data

Dec. 12, 1978 [JP] Japan .................. 53-155125

[51] Int. Cl.³ .................. F16K 31/44; B60T 13/00; F15B 13/0
[52] U.S. Cl. .................. 251/279; 91/49; 91/431; 60/547 R
[58] Field of Search .................. 60/547 R, 548, 594; 251/279; 91/49, 431

[56] References Cited

U.S. PATENT DOCUMENTS

| | | | |
|---|---|---|---|
| 3,044,265 | 7/1962 | Schwartz et al. | 60/548 |
| 3,168,812 | 2/1965 | Randol | 60/548 |
| 3,628,331 | 12/1971 | Shellhause | 91/49 X |
| 3,896,620 | 7/1975 | Flory | 60/547 |
| 4,161,867 | 7/1979 | Adachi | 60/548 |
| 4,179,980 | 4/1980 | Kito et al. | 60/548 |
| 4,181,064 | 1/1980 | Flory | 91/49 X |

*Primary Examiner*—A. Michael Chambers
*Attorney, Agent, or Firm*—Oblon, Fisher, Spivak, McClelland & Maier

[57] ABSTRACT

A vibration damping mechanism for a hydraulic booster including a manually operated pedal which includes a hydraulic booster body, a control valve mechanism disposed within the body, an input member slidably disposed within the body and operably connected to the control valve mechanism disposed within the body and first and second push rods positioned in tandem for operably connecting the input member to the manually operated pedal, the first and second push rods being bendably connected to each other at each end thereof with each end of the push rods being in eccentric arrangement relative to the input member such that radial movement of each end of the push rod is limited by the input member.

3 Claims, 2 Drawing Figures

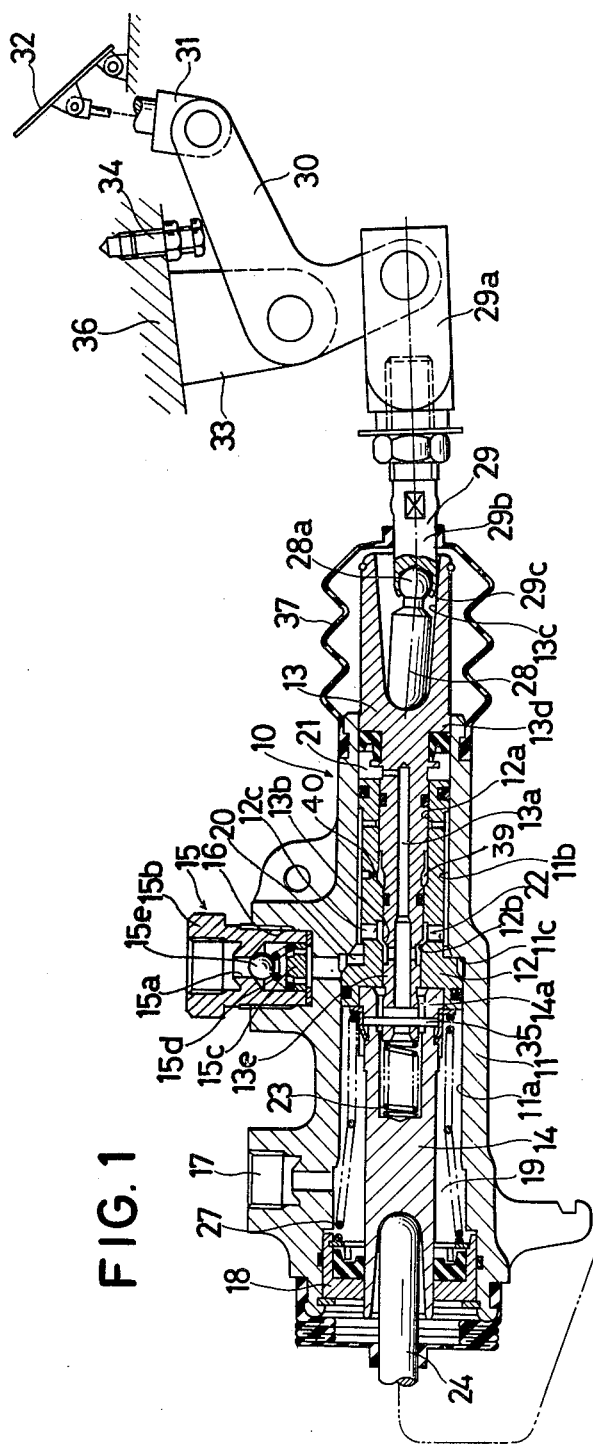
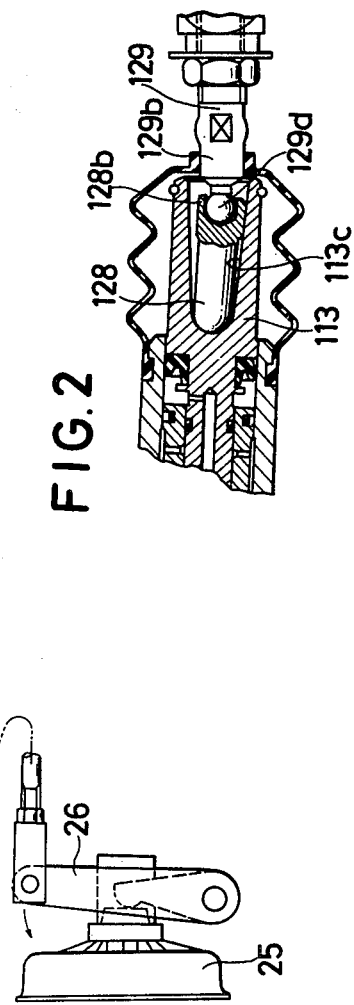
FIG. 1
FIG. 2

VIBRATION DAMPING MECHANISM FOR HYDRAULIC BOOSTER

BACKGROUND OF THE INVENTION

1. Field of the Invention

The present invention relates to a hydraulic booster for operating a clutch releasing device or a braking system of a motor vehicle, and more particularly to a vibration damping mechanism for an input member of the booster.

2. Description of the Prior Art

In a conventional hydraulic booster for operating a clutch releasing device or a braking system of a motor vehicle, vibration of an input member occurs due to a self-excited vibration of a control valve mechanism and resonance of the control valve mechanism with a hydraulic pump pulsation generated under operating conditions of the booster thereby causing a disagreeable feeling or sensation to be communicated to the operator upon operation of the pedal.

In order to dampen such vibration of the input member, hydraulic damping means have been provided within the booster but the hydraulic damping means has failed, due to a simple construction and the small size thereof, to dampen a vibration of large magnitude of the input member which is generated where the control valve mechanism constitutes by a poppet valve mechanism provided between a power piston and the input member and an output member mechanically connected to a clutch releasing device.

SUMMARY OF THE INVENTION

It is an object of the invention to provide a novel and improved vibration damping mechanism for dampening a vibration of large magnitude of an input member of a hydraulic booster without increasing the complication of the construction and size of the damping mechanism.

Another object of the present invention is to provide a vibration damping mechanism for the input member of a hydraulic booster wherein the input member is applied with a frictional sliding resistance in accordance with the magnitude of pedal depressing force.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is a longitudinal sectional view of a first embodiment of a hydraulic booster according to the present invention; and FIG. 2 is a partial view similar to FIG. 1, but showing a second embodiment of a hydraulic booster according to the present invention.

DETAILED DESCRIPTION OF THE PREFERRED EMBODIMENTS

Referring now to FIG. 1, there is shown a first embodiment of the hydraulic booster according to the present invention. The hydraulic booster 10 includes a body 11 fixed to a stationary part of a vehicle body (not shown), a power piston 12 sealingly and slidably inserted into a larger diameter bore 11a and a smaller diameter bore 11b which are formed in the body 11, an input member 13 sealingly and slidably inserted into the bore 11b and a stepped bore 12a formed in the power piston 12, and an output member 14 one end of which is inserted into the bore 12a of the power piston 12. The body 11 is formed with an inlet 16, which is provided with a flow controlling valve 15 therein and is supplied with hydraulic fluid from a pump and an outlet 17 hydraulically connected to a reservoir.

A plug 18 is sealingly and fixedly disposed in an open end of the bore 11a and the output member 14 is sealingly and slidably passed through the plug 18 thereby defining a drain chamber 19, which is in normal communication with the outlet 17, between one end of the power piston 12 and the plug 18. A working chamber 20 defined between the body 11 and the power piston 12 is normally in fluid communication with the inlet 16. A chamber 21 defined between the other end of the power piston 12 and the input member 13 is normally in fluid communication with a bore 14a formed in the output member 14 through an axial passage 13a formed in the input member 13. The bore 14a is also normally in fluid communication with the drain chamber 19.

The power piston 12 is formed with a seat 12b which operatively cooperates with a conical face 13b formed on the input member 13. The working chamber 20 is usually in communication with the bore 14a through a passage 12c, a choke valve 22, and the passage 13a, the choke valve 22 being defined by the seat 12b and conical face 13b. The power piston 12 and the output member 14 are usually positioned by a spring 27 in returned positions thereof as shown in FIG. 1 in which the power piston 12 is in contact with a stopping shoulder 11c of the body 11. The input member 13 is urged by a spring 23 provided in the bore 14a so as to space the face 13b from the seat 12b until the sliding movement of the input member 13 relative to the power piston 12 is limited by a pin 35. The output member 14 is operatively connected through a connecting rod 24 to release lever 26 of a conventional friction clutch 25, which is disengaged upon the pivotal movement of the lever 26 in the direction shown by arrow in FIG. 1, of the vehicle.

The flow controlling valve 15 includes a body 15b which is in screw-threaded engagement with the body 11 and is formed with a passage 15a, a seat 15c fixedly inserted into the body 15b, and a check ball 15e which is urged by a spring 15d to close the passage 15a.

The input member 13 is operatively connected to a clutch releasing pedal 32 through first and second push rods 28 and 29, a lever 30 and a connecting rod 31. The lever 30 is pivotally mounted on a fixed supporting member 33 at central portion thereof and is pivotally connected to the second push rod 29 and the connecting rod 31 at opposite ends thereof. The second push rod 29 includes a first member of clevis 29a pivotally connected to the lever 30 and a second member 29b which is in screw-threaded engagement with the clevis 29a at one end thereof as well known. The other hollow end 29c of the second member 29b is positioned in a tapered recess 13c formed in the input member 13 so as to rotatably grip a spherical head 28a formed on one end of the first push rod 28. Thus, the push rods 28 and 29 are bendable at ends 28a and 29c thereof. The other end of the first push rod 28 is of a half-sphere shape and is in contact with a bottom of the recess 13c. Thus, the end 29c of the second push rod 29 is in normal contact with a peripheral wall of the recess 13c due to the weights of the rods 28 and 29, so that the ends 28a and 29c of the push rods 28 and 29 are in eccentric arrangement relative to the input member 12.

A sealing boot 37 is provided between the body 11 and the push rod 29, and an adjustable stopper 34 is provided on a stationary part 36 of the vehicle body for limiting the return position of the lever 30. A chamber 39 defined by the power piston 12 and the input member 13 is in normal communication with the working chamber 20 through an orifice 40 formed in the power piston 12 so as to provide a hydraulically damping effect against vibration of the input member 13.

In operation of the booster, FIG. 1 illustrates the inoperative condition of the booster 10 wherein the choke valve 22 is fully opened by the spring 23 so that the hydraulic fluid supplied into the inlet 16 from the pump through the flow controlling valve 15 flows to the reservoir through the working chamber 20, passage 12c, choke valve 22, passage 13a, bore 14a, drain chamber 19 and outlet 17. Thus, there is no hydraulic pressure in working chamber 20.

When the clutch releasing pedal 32 is depressed by a driver of the vehicle the movement of the pedal 32 is transmitted to the input member 13 through rod 31, lever 30 and push rods 28 and 29 thereby causing the advancing of the input member 13 into the power piston 12. The choke valve 22 chokes the hydraulic fluid flow in accordance with the advancing of the input member 13 relative to the power piston 12 so that hydraulic pressure is generated in the working chamber 20 and is increased in accordance with the choking of the choke valve 22. Thus, the power piston 12 is slid by the hydraulic pressure in the working chamber 20 toward the plug 18 and moves the clutch releasing lever 26 in the direction shown by arrow in FIG. 1 through the output member 14 and the connecting rod 24 so that the clutch 25 is released. The input member 13 is advanced in accordance with the sliding of the power piston 12 so as to maintain choking of the choke valve 22.

In above-described operating condition of the booster 10, a radial force is generated by the pedal depressing force at a contact point between the end 29c of the push rod 29 and the peripheral wall of the recess 13c since the ends 28a and 29c of the push rods 28 and 29 are in eccentric arrangement relative to the input member 12. The radial force urges the right hand end of the input member 13 in a downward direction in FIG. 1 thereby causing pressed sliding engagement between lands 13d and 13e of the input member 13 and the body 11 and power piston 12, respectively. Such pressed sliding engagement causes enough frictional sliding resistance to dampen the vibration of the input member 13 during the operation of the booster 10, since the magnitude of vibration of the input member is proportional to the value of the hydraulic pressure in the working chamber 20 while the value of the hydraulic pressure in the working chamber 20 and the magnitude of the frictional sliding resistance are proportional to the magnitude of pedal depressing force.

When the pedal 32 is released, the input member 13 is moved by the spring 23 relative to the power piston 12 to thereby eliminate choking of the choke valve 22. Therefore, the hydraulic pressure in the working chamber 20 decreases. The power piston 12 and output member 14 are returned by the spring 27 in accordance with the decreasing of the hydraulic pressure in the working chamber 20 so that the clutch 25 is engaged.

Referring to FIG. 2, there is shown a second embodiment of the hydraulic booster according to the present invention. The difference of the second embodiment from the first embodiment is in the connection between the two push rods. In FIG. 2, a second push rod 129 is formed at one end thereof with a spherical head 129d which is rotatably gripped by a hollow end 128b of a first push rod 128. The hollow end 128b of the push rod 128 is normally in contact with a peripheral wall of the recess 113c of the input member 113 due to the weight of the rods 128 and 129.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vibration damping mechanism for a hydraulic booster including a manually operated pedal comprising:
    a hydraulic booster body;
    a piston disposed within said booster body;
    a control valve mechanism disposed within said body;
    an input member having first and second lands slidably disposed within said body and operatively connected to said control valve mechanism disposed within said body;
    first and second push rods positioned in tandem for operatively connecting said input member to said manually operated pedal;
    means for bendably connecting said first and second push rods to each other at each end thereof; and
    means for allowing eccentrical arrangement of said each end of said push rods relative to said input member such that radial movement of said each end of said push rods is limited by said input member such that a radial normal force is generated between said push rods and said booster body for effecting frictional sliding resistance between said first land and said body and between said second land and said piston to dampen said vibration of said input member during operation of said booster, said means for allowing eccentrical arrangement including a recess formed in said input member having a peripheral wall wherein said first and second push rod ends are positioned within said recess formed in said input member, and said radial movement of said push rods is limited by said peripheral wall of said recess.

2. A vibration damping mechanism according to claim 1, wherein said end of said second push rod includes a hollow portion formed therein, and said end of said first push rod is formed with a spherical head rotatably gripped within said hollow portion.

3. A vibration damping mechanism according to claim 1, wherein said end of said second push rod is formed with a spherical head, and said end of said first push rod is formed with a hollow portion which rotatably grips said spherical head therein.

* * * * *